US010968680B2

(12) United States Patent
Neufeld et al.

(10) Patent No.: US 10,968,680 B2
(45) Date of Patent: Apr. 6, 2021

(54) MODULAR ARMOR

(71) Applicant: EMSN INITIATIVE AND RESOLUTIONS 2013 LTD., Lod (IL)

(72) Inventors: Shmuel Neufeld, Lod (IL); Elazar Modizinsky, Beit El (IL); Omer Levi, Lod (IL); Harel Oberman, Efra (IL)

(73) Assignee: EMSN INITIATIVE AND RESOLUTIONS 2013 LTD., Tel Aviv (IL)

( * ) Notice: Subject to any disclaimer, the term of this patent is extended or adjusted under 35 U.S.C. 154(b) by 394 days.

(21) Appl. No.: 16/101,578

(22) Filed: Aug. 13, 2018

(65) Prior Publication Data

US 2020/0051403 A1 Feb. 13, 2020

(51) Int. Cl.
*E05G 1/024* (2006.01)
*G07F 19/00* (2006.01)
*F16B 5/00* (2006.01)

(52) U.S. Cl.
CPC ............ *E05G 1/024* (2013.01); *F16B 5/0036* (2013.01); *G07F 19/205* (2013.01)

(58) Field of Classification Search
CPC .. E05G 1/00; E05G 1/02; E05G 1/024; G07F 19/205; F16B 5/0032; F16B 5/0036
See application file for complete search history.

(56) References Cited

U.S. PATENT DOCUMENTS

| | | | | |
|---|---|---|---|---|
| 3,259,679 A * | 7/1966 | Nielsen | E05G 1/024 109/76 |
| 4,426,935 A * | 1/1984 | Nikoden, Jr. | E05G 1/024 109/79 |
| 4,559,881 A * | 12/1985 | Lankard | E05G 1/024 106/644 |
| 6,308,396 B1 * | 10/2001 | Lewis | E05G 1/00 29/464 |
| 6,971,322 B2 * | 12/2005 | DuBois | G07F 19/205 109/24.1 |
| 8,689,511 B2 * | 4/2014 | Fleming, III | E04B 1/02 52/582.1 |
| 9,683,401 B2 * | 6/2017 | Smith | E05G 1/02 |
| 10,113,571 B2 * | 10/2018 | Kubiniec | F16B 5/0036 |
| 10,781,625 B2 * | 9/2020 | Estill | E05G 1/024 |
| 2010/0282136 A1 * | 11/2010 | Stanley | E05G 1/005 109/64 |

(Continued)

*Primary Examiner* — Christopher J Boswell
(74) *Attorney, Agent, or Firm* — Mark David Torche; Patwrite Law

(57) ABSTRACT

A modular armor, having a rear armored panel including a first rear lateral edge, a second rear lateral edge and a rear bottom edge, where multiple lateral connectors are disposed on the first rear lateral edge and on the second rear lateral edge, the rear armored panel further having a rear bottom extension extending from said rear bottom edge, a first side armored panel, a second side armored panel, and a base armored panel, where the modular armor includes at least one ground connector designed to be threaded through the at least one aperture in a first intermediate platform thereof, at least one aperture in a bottom extension of the first side armored panel and into the ground, and at least one ground connector designed to be threaded through a second intermediate platform thereof, a bottom extension of the second side armored panel and into the ground.

20 Claims, 9 Drawing Sheets

(56) References Cited

U.S. PATENT DOCUMENTS

2012/0222590 A1* 9/2012 Marques ................. E05G 1/024
 109/78
2017/0167183 A1* 6/2017 Gulik ...................... E05G 1/024
2020/0118396 A1* 4/2020 Neufeld ................ G07F 19/205

* cited by examiner

MODULAR ARMOR

FIELD

The present disclosure generally relates to a system and methods for protecting ATMs and vending machines, and more particularly relates to modular armor that provides a mobile and modular system for protecting ATMs and vending machines, and a method for using same.

BACKGROUND

ATMs and vending machines are targets for outlaws intending to steal the cash stored therein. In order to prevent such tampering, ATM's and vending machines are typically situated inside an armor, which supply protection against tampering. Currently, armor for ATMs typically belongs to one of two types of armor. The first type is a heavy, thick and strong unit, which is typically made from steel plates welded together, providing an immovable and expensive option. The second type is a thin, inexpensive unit that is constructed of thinner metal sheet welded poorly to each other. The second armor is merely intended for preventing access to a cash storing portion of the device stored within the armor.

In some cases, both options are sometimes built in a predefined measurement from the factory and are moved to the desired ATM location. The armor is typically transferred from the factory to the desired position by a truck, occupying a large space therein due to the size of the armor, which is typically bigger than the ATM designed to be inserted therein. Sometimes, the ATMs or vending machines are manufactured with a built-in armor for preventing tampering thereof, thus making them heavier to be moved around. Additionally, one of the methods to tamper with ATMs and vending machines is to lift the ATM or vending machine into a vehicle and move it to a private place for the dismantling of the armor.

None of the above options is helpful when a large number of ATMs are in a need for protection in the same premise due to the large size and heavy cost of moving large amounts of armors. Additionally, none of the above options provides means for constructing or deconstructing an armor in the field instead of the factory. Thus, there is a great need for a solution that will provide both cost efficiency way of trafficking the armor and a constructible/deconstructable armor for temporary protection for ATM or vending machine.

SUMMARY OF THE INVENTION

In one aspect of the invention a modular armor is provided, including a rear modular armored panel including a first rear lateral edge, a second rear lateral edge and a rear bottom edge, where multiple lateral connectors are disposed on the first rear lateral edge and on the second rear lateral edge, the rear modular armored panel further includes a rear bottom extension extending from said rear bottom edge, a first side modular armored panel including a first side rear extension extends from a first side rear edge of the first side modular armored panel, where the first side rear extension includes multiple apertures designed to receive multiple lateral connectors disposed on the first rear lateral edge, a first side bottom extension extends from a first side bottom edge of the first side modular armored panel, where at least one aperture is designed to receive a ground connector disposed in the first side bottom extension, a second side modular armored panel includes a second side rear extension extends from a second side rear edge of the second side modular armored panel, where the second side rear extension includes multiple apertures designed to receive multiple lateral connectors disposed on the second rear lateral edge, a second side bottom extension extends from a second side bottom edge of the second side modular armored panel, where at least one aperture is designed to receive a ground connector disposed in the second side bottom extension, a base modular armored panel, including a first intermediate platform including a first intermediate proximal edge, where at least one aperture designed to receive a ground connector is disposed on said first intermediate platform, and where a first remote perpendicular wall extends vertically upwards from the first intermediate proximal edge, a first elevated platform including a first elevated remote edge and a first elevated proximal edge, where the first elevated platform is connected to said first remote perpendicular wall at the first elevated remote edge, and where a first proximal perpendicular wall extends vertically downward from the first intermediate proximal edge thereof, a central platform including a first central lateral edge and a second central lateral edge, where the central platform is connected to the first proximal perpendicular wall at the first central lateral edge thereof and where a second proximal perpendicular wall extends vertically upwards from the second central lateral edge thereof, a second elevated platform including a second elevated remote edge and a second elevated proximal edge, where the second elevated platform is connected to said second proximal perpendicular wall at the second elevated proximal edge thereof, and where the second remote perpendicular wall extends vertically downward from the second elevated remote edge thereof, and a second intermediate platform including a second intermediate proximal edge, where at least one aperture designed to receive a ground connector is disposed on said second intermediate platform, and where the second intermediate platform is connected to said second remote perpendicular wall at the second intermediate proximal edge thereof, a front modular armored panel including a first side front extension configured to be rotatably connected to the first side modular armored panel, and a second side front extension configured to be releasably secured to the second side modular armored by a locking element, where the modular armor includes at least one ground connector designed to be threaded through the at least one aperture in the first intermediate platform, the at least one aperture in the bottom extension of the first side modular armored panel and into the ground, and at least one ground connector designed to be threaded through the second intermediate platform, the bottom extension of the second side modular armored panel and into the ground.

BRIEF DESCRIPTION OF THE DRAWINGS

The invention may be more clearly understood upon reading of the following detailed description of non-limiting exemplary embodiments thereof, with reference to the following drawings, in which.

The following detailed description of embodiments of the invention refers to the accompanying drawings referred to above. Dimensions of components and features shown in the figures are chosen for convenience or clarity of presentation and are not necessarily shown to scale. Wherever possible, the same reference numbers will be used throughout the drawings and the following description to refer to the same and like parts.

DETAILED DESCRIPTION

Illustrative embodiments of the invention are described below. In the interest of clarity, not all features/components of an actual implementation are necessarily described.

The term "ATM" as mentioned herein depicts Automated Teller Machines (ATMs), vending machines and other devices that store money or goods and require additional protection against tampering. For example, soft drinks machines, arcade machines, safes and the like.

The invention allows ATM owners and operators to increase ATMs' security in higher risk locations. The invention described herein is a modular armor, which is easily transportable and lightweight compared to other armors. Additionally, the modular armor can be installed and/or removed without requiring the device stored within to be changed or modified.

The invention describes various forms of physical protection for ATMs in the form of modular armored panels. Although the figures illustrate a certain model of ATM for exemplary purposes, the invention is not limited to any model or manufacturer. Additionally, the features, installation, and operation of the armor components described herein may be adopted to any model of ATM. Additionally, one of the advantages of the invention is that if a single panel needs to be replaced, a new panel may be purchased instead of substituting the entire armor.

Figure 1:
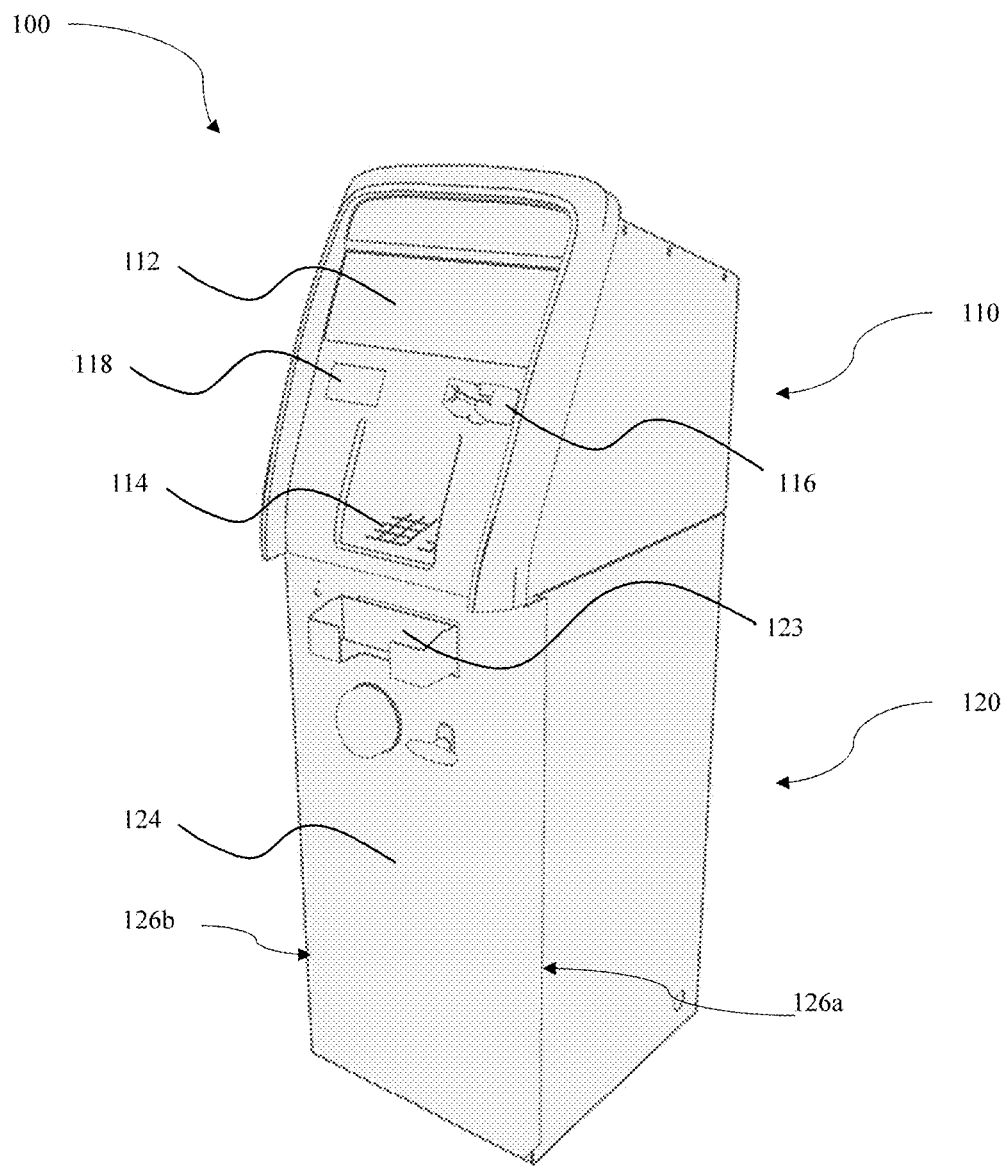
FIG. 1 discloses an ATM that requires a protection of a modular armor of the invention, according to known prior art devices.

FIG. 1 discloses an ATM that requires a protection of a modular armor of the invention, according to known prior art devices. FIG. 1 shows an ATM 100 comprising two major portions: an interface portion 110 configured to be accessible to a user, and a safe portion 120 which should be inaccessible to users and accessible to operators. The interface portion 110 typically includes components which enable users to interact with the ATM 100 in order to perform financial transactions. In most cases, the interface portion 110 communicates with a computer (not shown) located inside the ATM 100. The computer is connected to a display 112 for presenting information to the user; a keypad 114 for enabling the user to enter a pin code; a card reader 116 enabling the user to insert a magnetic card thereto; and a printer 118 for printing transaction receipts. The interface portion 110 may include other components, such as cameras, power supplies, speakers, and the like. In some embodiments, the display 112 may be combined with the keypad 114 in the form of a touch screen, enabling the user to interact directly with the display 112.

The safe portion 120 comprising a safe and a cash distributing mechanism 123 disposed on a front surface thereon, for distributing case stored in the safe to users. The safe portion 120 further comprises a safe door 124, located on a front side thereof, which generally has a hinged side 126A and a safe door opening side 126B opposite to the hinged side 126A. In some cases, the safe door 124 serves as the primary target for the tampering, since the safe door 124 is vulnerable to various forms of attack. For example, a vertical seam (not shown) disposed at the safe door opening side 126b of the safe door 124 is a common and vulnerable location for attacks, for example, by a crowbar applying brute force on the safe door to fold the safe door 124 or to crack the safe door 124 locks. In many embodiments, a plurality of holes (not shown) are drilled through a bottom surface of the safe portion 120. In some embodiments, the plurality of holes may be four holes, where each hole is placed about every corner of the base of the safe portion 120. The holes are configured to allow ground connectors such as anchor bolts to be accommodated therein, for securing the ATM 100 to a solid base or the ground beneath the ATM 100 in order to prevent lifting the entire ATM 100 from the location thereof.

Figure 2:
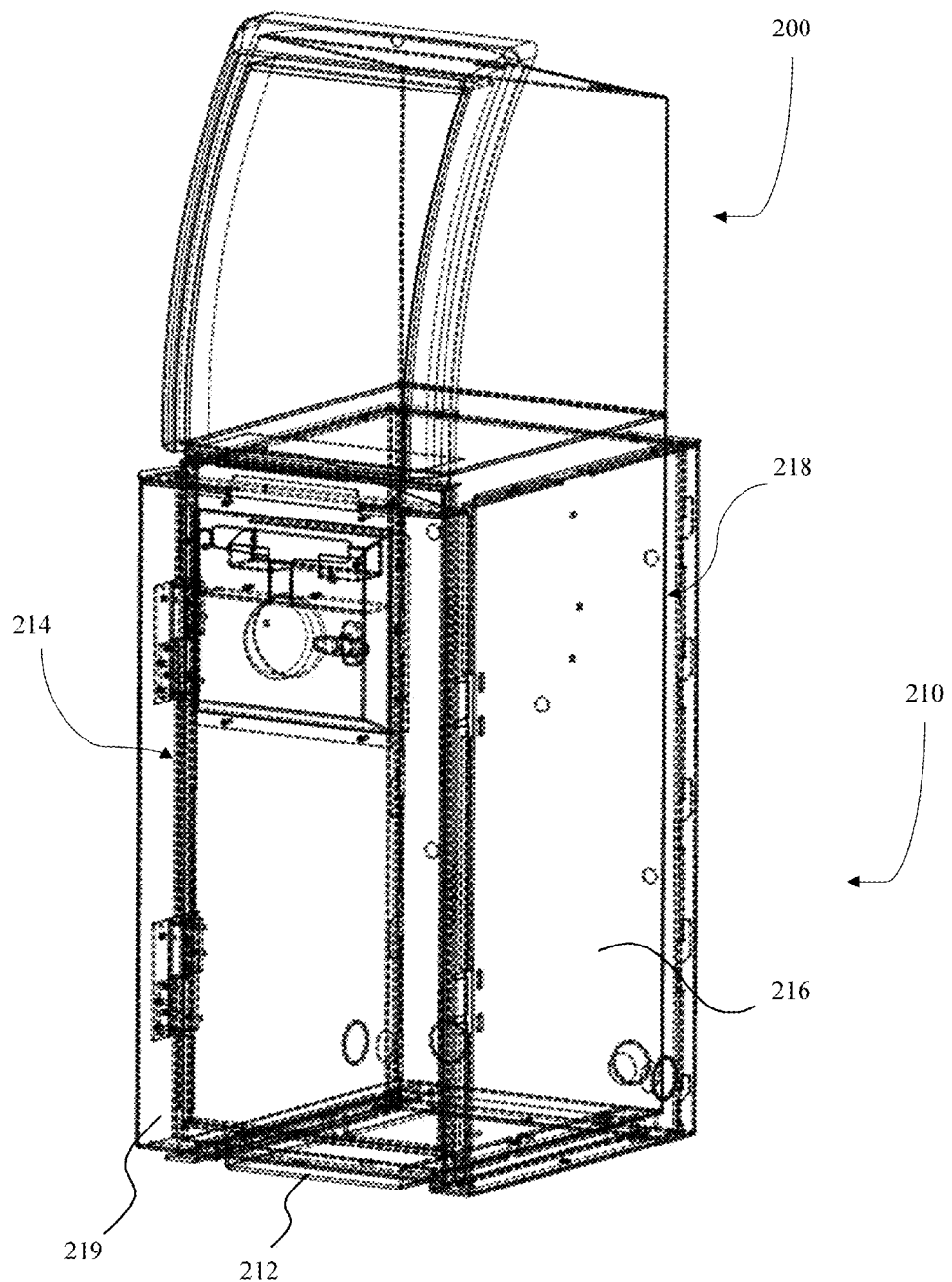
FIG. 2 discloses an ATM positioned within a modular armor, according to exemplary embodiments of the subject matter.

FIG. 2 discloses an ATM positioned within a modular armor, according to exemplary embodiments of the subject matter. FIG. 2 shows an ATM 200 having a safe portion positioned within a modular armor 210. The modular armor 210 may be configured to provide at least a portion of the ATM 200 with protection from tampering therewith. Such tampering may include drilling, applying blunt force, cutting and other tampering desired by a person skilled in the art.

In some embodiments, the modular armor 210 comprises a plurality of modular armored panels that are connected directly or operably to each other and are secured by a base modular armored panel 212. In some embodiments, each of the modular armored panels of the modular armor 210 may be formed of different materials or have a different thickness and dimensions. In other embodiments, the modular armored panels may be formed of the same materials and optionally comprise the same thicknesses or height. In some embodiments, the modular armor 210 is designed to fit as close as possible to the surfaces of the ATM 200 residing therein. In such cases, the ATM 200 may be comfortably inserted into the modular armor 210, while preventing vacant space inside the armor, which may ease tampering with the modular armored panels of the modular armor 210. In some embodiments, the modular armored panels of the modular armor 210 comprises a first side modular armored panel 214, a second side modular armored panel 216 and a rear modular armored panel 218. Additionally, the modular armor 210 further comprise an openable front modular armored panel 219, which is configured to be opened for enabling the ATM 200 to be inserted into the modular armor 210 and further configured to be closed and locked, for securing the ATM 200 therein.

In some cases, the modular armor is shaped as a box, wherein the first side modular armored panel 214 is parallel to the second side modular armored panel 216. Additionally, both the first side and the second side modular armored panels 214 and 216 may be perpendicular to the front modular armored panel 219 and to the rear modular armored panel 218. In further embodiments, the front modular armored panel 219 and the rear modular armored panel 218 are parallel to each other.

In some embodiments, at least some of the modular armored panels extend vertically from the ground to the same predetermined height. In some cases, the predetermined height is at least as high as the top surface of the safe portion of the ATM 200. In further embodiments, the at least some of the modular armored panels may extend upwards, above the interface portion of the ATM 200. In yet another embodiment of the invention, additional extension modular armored panels may be connected on top of the modular armored panels. In such cases, the extension modular armored panels may surround the interface portion of the ATM 200.

In some embodiments, the modular armor 210 may be formed from many types of steel, such as plate steel, stainless steel, and abrasion-resistant (AR) plate steel. In some embodiments, the selected steel may be configured to provide both better physical protection, low weight, and low cost. In some embodiments, at least one of the modular armored panels is formed of a single sheet of metal, which was folded to form the final shape thereof. Thus, in order to make the three-dimensional shape of the panels, the panels are folded during the manufacture thereof by applying pressure to a single sheet of material. Folding the metal plates is both cheaper and more durable than welding. In some embodiments, the modular armor 210 is made only with folded metal panels without applying a single welding thereon.

In some embodiments, the weight of the entire modular armor is below 100 Kgs, including all the modular armored panels and the base modular armored panel. In further embodiments, the weight of the entire modular armor is in the range of 50-80 Kgs. In some embodiments, the weight of the modular armor is below the maximum package weight limit imposed by some commercial freight carriers, including Federal Express (FedEx™). In further embodiments, the weight of the modular armor enables the modular armor to be shipped by air. Thus, the shipping costs for the modular armor may be low due to the low weight. Additionally, when the modular armor is shipped, the modular armored panels may be placed one on top of the other, creating efficient package that occupies less space than the built alternative armors.

Figure 3:
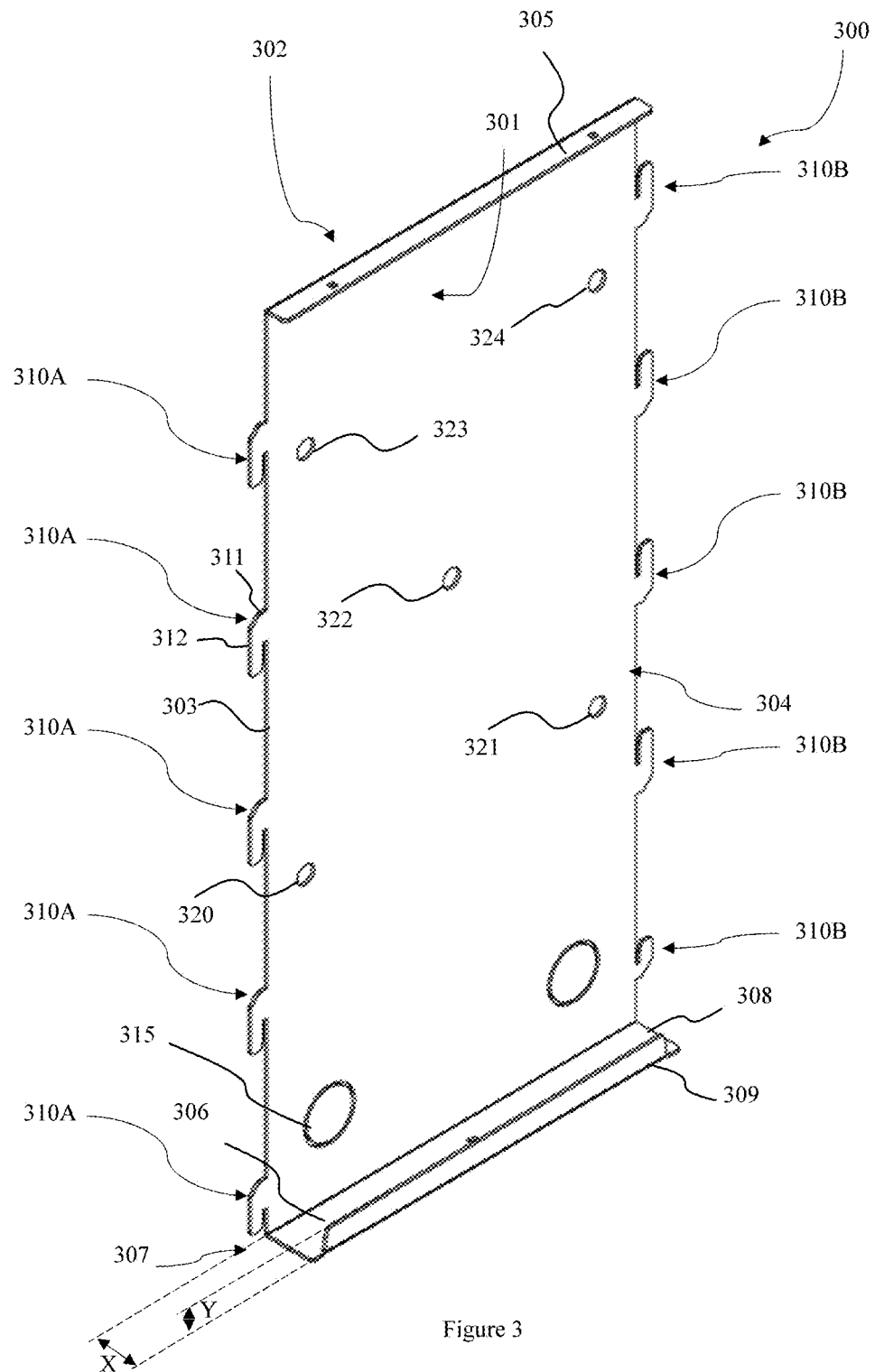
FIG. 3 discloses a rear modular armored panel of a modular armor, according to exemplary embodiments of the subject matter.

FIG. 3 discloses a rear modular armored panel of a modular armor, according to exemplary embodiments of the subject matter. FIG. 3 shows a rear modular armored panel 300, designed to be placed vertically to the ground. In some embodiments, the rear modular armored panel 300 is designed to be placed adjacent to a wall. In some embodiments, the rear modular armored panel 300 comprises a rear inner surface 301, a rear outer surface 302, a first rear lateral edge 303, a second rear lateral edge 304, a rear top edge 305 and a rear bottom edge 306. In some embodiments, a plurality of rear holes 320, 321, 322, 323 and 324 are drilled through the rear modular armored panel 300 for allowing one or more connectors to pass therethrough and be accommodated therein. The connectors may be used for securing the rear modular armored panel 300 to a surface, such as a wall, located behind the rear modular armored panel 300. In some embodiments, the rear modular armored panel 300 comprises one or more apertures (such as 315) for allowing cables to extend from within the modular armor to a power source or other plugs located outside the modular armor.

In some embodiments, a rear bottom extension 307 protrudes from the rear bottom edge 306 of the rear modular armored panel 300. In some cases, the rear bottom extension 307 is designed in an L shape. The rear bottom extension 307 may protrude horizontally from the rear inner surface 301 of the rear modular armored panel 300 and is configured to be secured to the base modular armored panel 212. In some embodiments, the rear bottom extension 307 may protrude from the entire length of the rear bottom edge 306 of the rear modular armored panel 300. In some embodiments, the rear bottom extension 307 comprises a rear bottom protrusion element 308 and a rear bottom perpendicular element 309. In some cases, the rear bottom protrusion element 308 extends perpendicularly to the rear modular armored panel 300, for example forwards, and adjacent to the ground. The rear bottom perpendicular element 309 may extend substantially perpendicularly upwards from a distal edge of the rear bottom protrusion element 308 and upwards. In some embodiments, the rear bottom perpendicular element 309 may be perpendicular to the rear inner surface 301 of the rear modular armored panel 300. In some cases, the length of the rear bottom protrusion element 308 is X and the height of the rear bottom perpendicular element 309 is Y. The distances marked as X and Y are determined by the manufacturer/purchaser of the modular armor and may vary between models of the modular armor in accordance with the manufacturing capabilities and/or models.

In some embodiments, a plurality of rear lateral connectors are disposed on the lateral edges of the rear modular armored panel 300. The connectors, for example the rear lateral connectors, may be L shaped. In some embodiments, first side rear lateral connectors 310A are disposed on the first rear lateral edge 303 and second side rear lateral connectors 310B are disposed on the second rear lateral edge 304 of the rear modular armored panel 300. In some embodiments, the rear lateral connectors 310A and 310B are flush on the same plane of the rear modular armored panel 300 and may be designed with the same thickness thereof. The rear lateral connectors 310A and 310B may be formed from a rear horizontal arm 311 and a rear vertical arm 312. In some embodiments, the rear horizontal arm 311 extends vertically/laterally outwards from the lateral sides of the rear modular armored panel 300. In some embodiments, the rear vertical arm 312 extends perpendicularly to the rear horizontal arm 311 from a distal edge thereof. In some embodiments, the rear vertical arm 312 and at least a portion of the rear horizontal arm 311 are designed to enter an aperture located on the side modular armored panels (not shown). In such cases, the rear lateral connectors 310A and 310B are used to connect the side modular armored panels 214 and 216 to the rear modular armored panel 300. In some embodiments, the first side rear lateral connector 310A faces downwards, such that the rear vertical arm 312 of each of the first side rear lateral connectors 310A extends perpendicularly downwards toward the rear bottom edge 306. In further embodiments, the second side rear lateral connectors 310B face upwards, such that the rear vertical arm 312 of each of the second side rear lateral connectors 310B extends perpendicularly upwards toward the rear top edge 305. The vertical flip of the vertical arms of the lateral connectors 310A and 310B is configured to ease the assembly of the modular armor. In some embodiments, the first side and second side rear lateral connectors 310A and 310B are equally spaced along the first and second edges of the rear modular armored panel 300.

Figure 4:
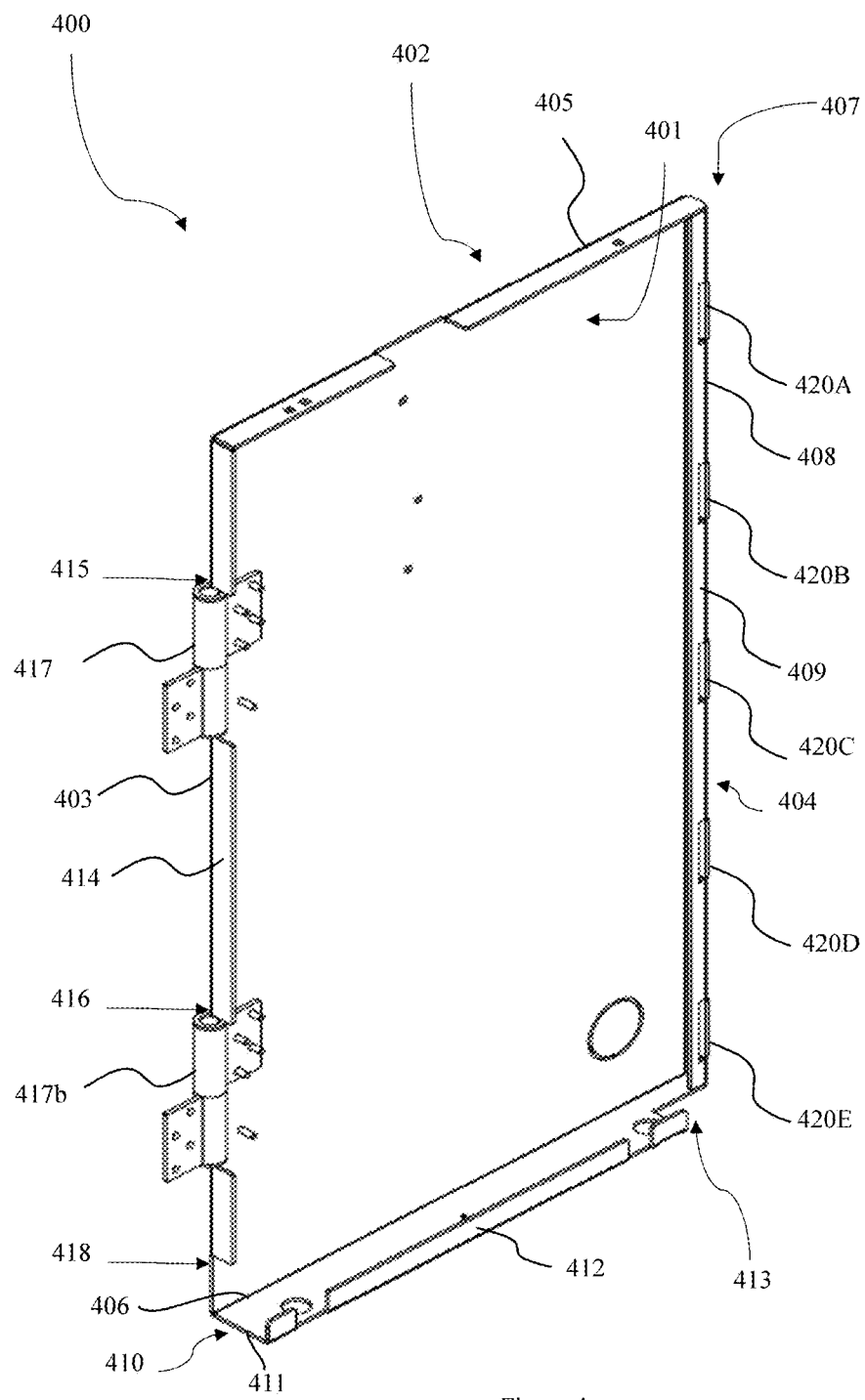
FIG. 4 discloses a first side modular armored panel of the modular armor, according to exemplary embodiments of the subject matter.

FIG. 4 discloses a first side modular armored panel of the modular armor, according to exemplary embodiments of the subject matter. FIG. 4 shows a first side modular armored panel 400 of the modular armor, which is designed to be placed vertically to the ground. In some embodiments, the first side modular armored panel 400 comprises a first side inner surface 401, a first side outer surface 402, a first side front edge 403, a first side rear edge 404, a first side top edge 405 and a first side bottom edge 406. In some embodiments, the first side rear edge 404 comprises a first side rear extension 407 and the first side bottom edge 406 comprises a first side bottom extension 410.

In some embodiments, the first side rear extension 407 protrudes from the entire length of the first side rear edge 404 of the first side modular armored panel 400 and from the first side inner surface 401 thereof. The first side rear extension 407 comprising a first side rear protrusion element 408 and a first side rear perpendicular element 409. The first side rear protrusion element 408 extends from the first side inner surface 401 of the first side modular armored panel 400 and at the first side rear edge 404 thereof in a perpendicular manner. In some embodiments, the first side rear protrusion element 408 extends to a predefined distance from the first side modular armored panel 400, which is slightly larger than the size of the lateral connectors disposed on a first side of the rear modular armored panel (300 in FIG. 3). The first side rear perpendicular element 409 extends perpendicularly from a distal edge of the first side rear protrusion element 408 and towards the first side front edge 403. In some embodiments, the first side rear perpendicular element 409 extends to a predefined distance from the first side rear protrusion element 408, which is slightly larger than the width of the lateral connectors disposed on the first side of the rear modular armored panel 300.

In some embodiments, a plurality of first side apertures 420A-420E are vertically distributed along the length of the first side rear perpendicular element 409. The plurality of first side apertures 420A-420E are configured to receive therethrough a vertical arm and at least a portion of a horizontal arm of the lateral connectors (not shown), which are connected to a rear modular armored panel (not shown). Thus, the plurality of first side apertures 420A-420E enable connecting the first side modular armored panel 400 with the rear modular armored panel 300. In some embodiments, the plurality of first side apertures 420A-420E are designed as elongated rectangles. In other embodiments, the plurality of first side apertures 420A-420E may be shaped similarly to a vertical cross section of the lateral connectors. In some embodiments, the plurality of first side apertures 420A-420E are equally spaced along the first side rear perpendicular element 409.

In some embodiments, the first side bottom extension 410, protrudes from the first side bottom edge 406 of the first side modular armored panel 400. Additionally, the first side bottom extension 410 extends horizontally from the first side inner surface 401 of the first side modular armored panel 400 and is configured to be adjacently situated on the ground below the modular armor. In some embodiments, the first side bottom extension 410 comprises a first side bottom protrusion element 411 and a first side bottom perpendicular element 412. The first side bottom protrusion element 411 extends perpendicularly to the first side modular armored panel 400 and substantially parallel to the ground. In some embodiments, the first side bottom protrusion element 411 comprises a squared recess in the first side distal rear corner 413 thereof. Said squared recess may be designed to house at least a portion of the bottom protrusion element of the rear modular armored panel 300. The first side bottom perpendicular element 412 extends substantially perpendicularly upwards from a distal edge of the first side bottom protrusion element 411 and towards the first side top edge 405. In some embodiments, the first side bottom perpendicular element 412 may be parallel to the first side inner surface 401 of the first side modular armored panel 400. In some cases, the dimensions of the first side bottom extension 410 are identical to the dimensions of the bottom extension of the rear modular armored panel, as aforementioned in FIG. 3.

In some embodiments, the first side front edge 403 of the first side modular armored panel 400 comprising a first side front perpendicular element 414. The first side front perpendicular element 414 may extend in a perpendicular manner from the first side inner surface 401 of the first side modular armored panel 400 and at the first side front edge 403 thereof. In some embodiments, the first side front perpendicular element 414 comprising at least one front recess along the length thereof In some embodiments, the first side front perpendicular element 414 comprises at least a front upper recess 415, a front intermediate recess 416 and a front lower recess 418 disposed therein. In some embodiments, the upper front recess 415 and the intermediate front recesses 416 are configured to contain hinges 417A and 417B, respectively, where the hinges 417A and 417B may be configured to connect a front modular armored panel (not shown) thereto. Hinges 417A and 417B may be replaced with any additional fitting mechanisms known to a person skilled in the art. In some embodiments, the front lower recess 418 may be configured to enable at least a portion of a base modular armored panel (not shown) to pass therethrough during the assembly of the modular armor.

Figure 5:
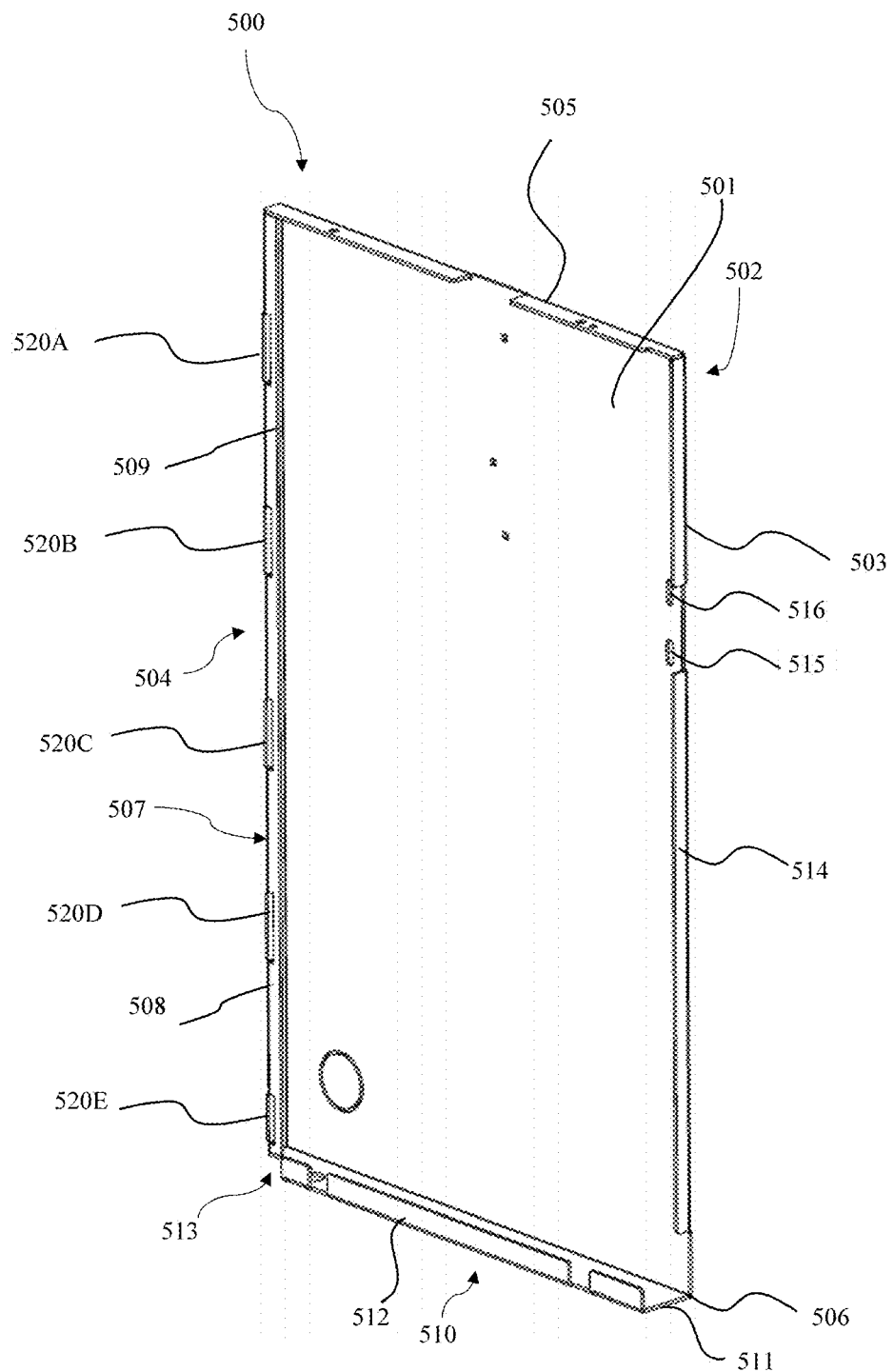
FIG. 5 discloses a second side modular armored panel of the modular armor, according to exemplary embodiments of the subject matter.

FIG. 5 discloses a second side modular armored panel of the modular armor, according to exemplary embodiments of the subject matter. FIG. 5 shows a second side modular armored panel 500 of the modular armor, which is designed to be placed substantially vertically to the ground. In some embodiments, the second side modular armored panel 500 comprises a second side inner surface 501, a second side outer surface 502, a second side front edge 503, a second side rear edge 504, a second side top edge 505 and a second side bottom edge 506. In some embodiments, the second side rear edge 504 comprises a second side rear extension 507 and the second side bottom edge 506 comprises a second side bottom extension 510. In some cases, the second side rear extension 507 and the second side bottom extension 510 are designed as a mirror image of the rear L shaped extension and the bottom L shaped extension of the first side modular armored panel (as disclosed in FIG. 4).

In some embodiments, the second side rear extension 507 protrudes from the entire length of the rear edge 504 of the second side modular armored panel 500 and from the second side inner surface 501 thereof. The second side rear extension 507 comprises a second side rear protrusion element 508 and a second side rear perpendicular element 509. The second side rear protrusion element 508 extends from the second side inner surface 501 of the second side modular armored panel 500 and at the second side rear edge 504 thereof in a substantially perpendicular manner. In some embodiments, the second side rear protrusion element 508 extends to a distance from the second side modular armored panel 500, said distance is slightly larger than the size of the lateral connectors disposed on the second lateral side of the rear modular armored panel. The second side rear perpendicular element 509 extends perpendicularly from a distal edge of the second side rear protrusion element 508 and towards the second side front edge 503. In some embodiments, the second side rear perpendicular element 509 extends to a distance from the second side rear protrusion element 508, said distance is slightly larger than the width of the lateral connectors disposed on the second side of the rear modular armored panel.

In some embodiment, a plurality of second side apertures 520A-520E are vertically distributed along the length of the second side rear perpendicular element 509. The plurality of second side apertures 520A-520E are configured to receive therethrough a vertical arm and at least a portion of a horizontal arm of the lateral connectors (not shown), which are connected to a rear modular armored panel (not shown). Thus, connecting the second side modular armored panel 500 with the rear modular armored panel. In some embodiments, the plurality of second side apertures 520A-520E are designed as elongated rectangles. In other embodiments, the plurality of second side apertures 520A-520E may be shaped similarly to a vertical cross section of the lateral connectors disposed on the second lateral side of the rear modular armored panel. In some embodiments, the plurality of second side apertures 520A-520E are equally spaced along the second side rear perpendicular element 509.

In some embodiments, the second side bottom extension 510 protrudes from the second side bottom edge 506 of the second side modular armored panel 500. Additionally, the second side bottom extension 510 may extend horizontally from the second side inner surface 501 of the second side modular armored panel 500 and is configured to be situated adjacently to the ground below the modular armor. In some embodiments, the second side bottom extension 510 comprises a second side bottom protrusion element 511 and a second side bottom perpendicular element 512. The second side bottom protrusion element 511 extends perpendicularly to the second side modular armored panel 500 and adjacent to the ground. In some embodiments, the second side bottom protrusion element 511 comprises a squared recess in the distal rear corner 513 thereof. Said squared recess may be designed to house at least a portion of the bottom protrusion element of the rear modular armored panel 300. The second side bottom perpendicular element 512 extends substantially perpendicularly upwards from a distal edge of the second side bottom protrusion element 511 and upwards towards the second side top edge 505. In some cases, the second side bottom perpendicular element 512 may be parallel to the second side inner surface 501 of the second side modular armored panel 500. In some cases, the dimensions of the second side bottom extension 510 are identical to the dimensions of the bottom L shaped extension of the first side modular armored panel, as aforementioned in FIG. 4.

In some embodiments, the second side front edge 503 of the second side modular armored panel 500 comprises a second side front perpendicular element 514. The front perpendicular element 514 may extend from the second side front edge 503 perpendicularly to the second side modular armored panel 500 and from the second side inner surface 501 thereof. In some embodiments, the second side front perpendicular element 514 defines at least one front recess 515 therein. In such cases, at least one aperture 516 is disposed on the second side modular armored panel 500, and in close proximity to the at least one front recess 515. In some embodiments, the at least one front recess 515 is configured to accommodate at least a portion of a locking element such as half of a hasp for placing a lock therein. In such cases, the second half is situated on the front modular armored panel (not shown). For example, half of a hasp for the C-series of Mul-T-Lock Ltd.

Figure 6:
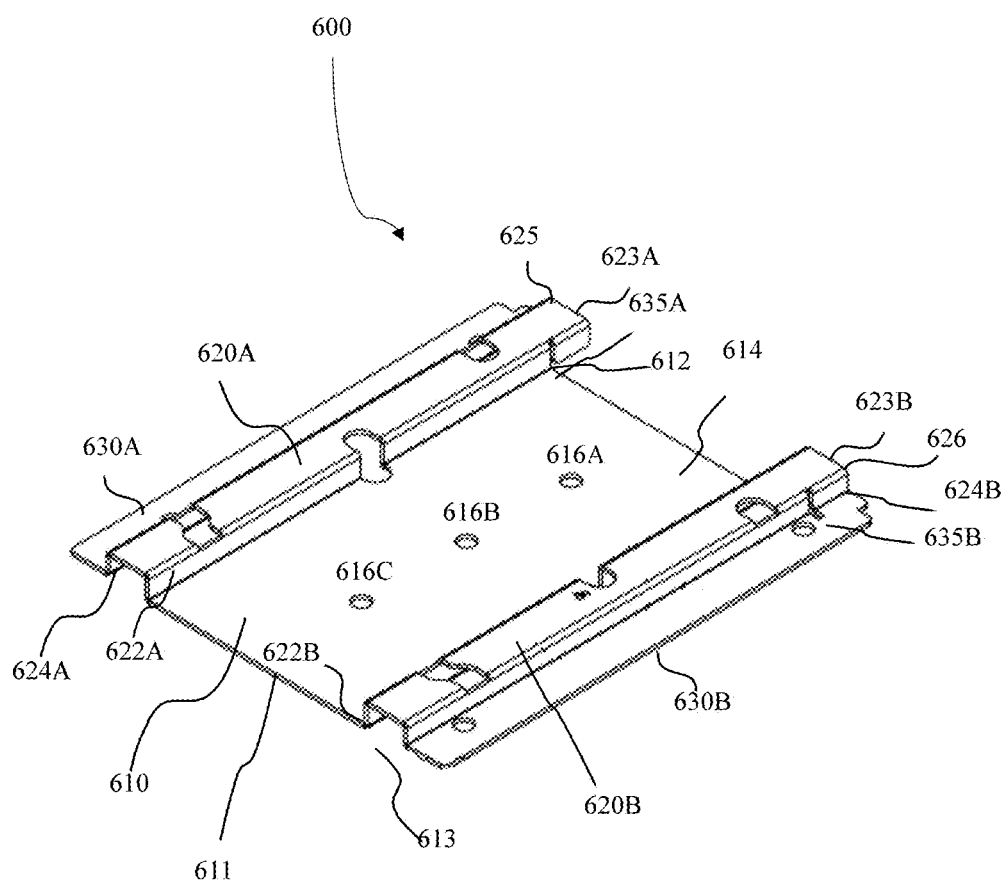
FIG. 6 discloses a base modular armored panel of the modular armor, according to exemplary embodiments of the subject matter.

FIG. 6 discloses a base modular armored panel of the modular armor, according to exemplary embodiments of the subject matter. FIG. 6 shows a base modular armored panel 600, which is configured to be installed on and to hold together the first side, the second side and the rear modular armored panels. In some embodiments, the base modular armored panel 600 is installed on the extensions of the first side, the second side and the rear modular armor panels. The base modular armored panel 600 is designed with at least one aperture therein for allowing at least one ground connector therethrough for connecting the base modular armored panel 600 to the ground below the modular armor. In further embodiments, the base modular armored panel 600 is designed with at least one additional aperture for allowing at least one connector, which may be ground connector or a connecting element to the base modular armored panel 600, arriving from an ATM residing inside the modular armor therethrough for connecting the ATM directly to the ground.

The base modular armored panel 600 comprises a base central platform 610, a base first and second elevated platforms 620A and 620B, extending from a first and a second central lateral sides of the base central platform 610, and a first and a second base intermediate platforms 630A and 630B extending from the elevated platforms 620A and 620B. In some embodiments, the central platform 610 is shaped as a rectangle, having a central front edge 611, a central first lateral edge 612, a second central lateral edge 613 and a rear edge 614. In some embodiments, the central platform 610 may comprise at least one aperture disposed therein. In some cases, the central platform 610 comprises three apertures 616A, 616B and 616C, for receiving therethrough and accommodating therein ground connectors for connecting the base modular armored panel 600 to the ground below the modular armor. In some embodiments of the invention, the length of the central platform 610 is about the length of the rear modular armored panel minus twice the distance X (of the two extensions of the first side and second side modular armored panels).

In some embodiments, a first elevated platform 620A is connected to the first central lateral edge 612 of the central platform 610 by a first proximal perpendicular wall 622A. A second elevated platform 620B is connected to the second central lateral edge 613 of the central platform 610 with a second proximal perpendicular wall 622B. In some embodiments, the first and second proximal perpendicular walls 622A and 622B, extends just above the distance Y of the bottom perpendicular elements of the first, second and rear modular armored panels. In some embodiments, the elevated platforms 620A and 620B are attached to a first and second elevated extensions 623A and 623B (accordingly) extending beyond the central rear edge 614 of the central platform 610. In such case, the first and second elevated extensions 623A and 623B may comprise a length which is about the length of the bottom extension of the rear modular armored panel 300. In some embodiments, the first and second elevated platforms 620A and 620B are identical to each other. In other embodiments, the first and second elevated platforms 620A and 620B are mirror image of each other. In some embodiments, the first and second elevated platforms 620A and 620B and the first and second elevated extensions 623A and 623B are formed with a smooth texture, configured to ease sliding devices, such as ATMs, thereon. In some embodiments, each of the first and second elevated platforms 620A and 620B may comprise at least one aperture disposed thereon. In such cases, the at least one aperture disposed thereon may be used for fitting at least a portion of the ATM therethrough. In other embodiments, at least one aperture may be used for passing therethrough and accommodating therein connectors for connecting the ATM through the first and second elevated platforms 620A and 620B to the ground below the modular armor.

In some embodiments, the first elevated platform 620A is connected to a first intermediate platform 630A by a first remote perpendicular wall 624A extending from a first elevated remote edge 625 thereof. The second elevated platform 620B is connected to a second intermediate platform 630B by a second remote perpendicular wall 624B extending from a second elevated remote edge 626 thereof. The first and second remote perpendicular walls 624A and 624B are extending perpendicularly downwards from remote edges 615 and 616 of the first and second elevated platforms 620A and 620B. In some embodiments, the first and second remote perpendicular walls 624A and 624B are parallel to the first and second proximal perpendicular walls 622A and 622B. In some embodiments, the height of the first and second remote perpendicular walls 624A and 624B may be smaller than distance Y, and in further embodiments is about Y minus the width of the bottom protrusion element. The height of the first and second remote perpendicular walls 624A and 624B is designed to bring the first and second intermediate platforms 630A and 630B to be in contact with the bottom protrusion elements 411, 511 of the first side and second side modular armored panels 400, 500, respectively.

In some embodiments, the first and second intermediate platforms 630A and 630B comprises at least one aperture for allowing ground connector to pass therethrough and to accommodate the ground connector therein. In some embodiments, the first intermediate platform 630A may be positioned above the bottom protrusion element 411 of the first side modular armored panel 400 and the second intermediate platform 630B may be positioned above the bottom protrusion element 511 of the second side modular armored panel 500. In further embodiments, the at least one apertures in the first intermediate platform 630A may be positioned above at least one aperture in the bottom protrusion element 411 of the first side modular armored panel 400. Additionally, the at least one apertures in the second intermediate platform 630B may be positioned above at least one aperture in the bottom protrusion element 511 of the second side modular armored panel 500. In such cases, the ground connector that passes through the at least one aperture in the first and second intermediate platforms 630A and 630B and into the ground below the modular armor, also passes through the at least one aperture in the bottom protrusion elements 411, 511, of the first side and second side modular armored panels 400, 500, respectively. Thus, by accommodating the ground connector through the at least one aperture in the first and second intermediate platforms 630A and 630B, the modular armor is secured to the ground and the base modular armored panel secures the first side, second side and the rear modular armored panels. In some embodiments, the ground connectors may be anchor bolts. In other embodiments, the ground connectors may be screws that are configured to be connected to matching threaded bores beneath the modular armor.

In some embodiments, a first slot 635A extends through the first proximal perpendicular wall 622A and through the first remote perpendicular wall 624A. Additionally, a second slot 635B extends through the second proximal perpendicular wall 622B and through the second remote perpendicular wall 624B. In some embodiments, the first slot 635A and the second slot are situated along an axis, extending beyond the central rear edge 614 and in parallel thereto, and is further perpendicular to the first and second elevated platform 620A and 620B. In some embodiments, the first and second slots 635A and 635B are dimensioned to receive therein a portion of the bottom perpendicular element (such as the bottom perpendicular element 309 of FIG. 3) of a bottom extension of the rear panel. Thus, the first and second slots 635A and 635B are configured to secure the rear modular armored panel to the ground.

Figure 7:
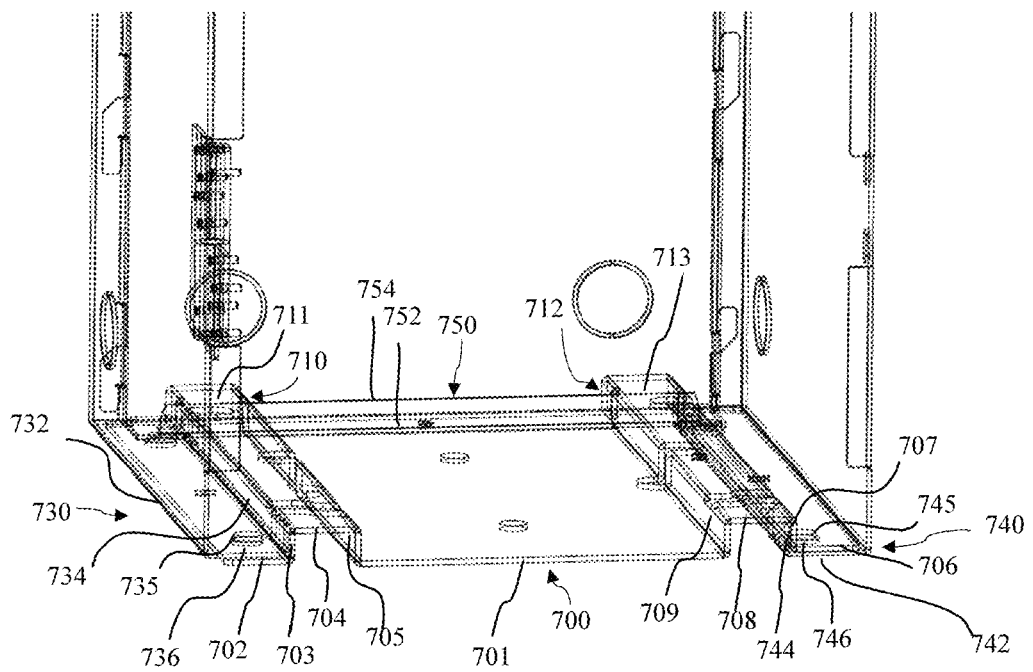
FIG. 7 discloses the base modular armored panel of FIG. 6, installed on the bottom extensions of the front side modular armored panel of FIG. 4, second side modular armored panel of FIG. 5 and the rear modular armored panel of FIG. 3, according to exemplary embodiments of the subject matter.

FIG. 7 discloses the base modular armored panel of FIG. 6, installed on the bottom extensions of the front side modular armored panel of FIG. 4, second side modular armored panel of FIG. 5 and the rear modular armored panel of FIG. 3, according to exemplary embodiments of the subject matter. FIG. 7 shows a base modular armored panel 700 placed on a first side bottom extension 730 belonging to a first side modular armored panel, on a second side bottom extension 740 and on a rear bottom extension 750 belonging to a rear modular armored panel. As shown, a central platform 701 is placed on the same plane with three bottom protrusion elements 732, 742 and 752 of the bottom extensions 730, 740 and 750. As mentioned in FIGS. 3 to 5, each of the bottom extensions 730, 740 and 750 comprising bottom protrusion elements 732,742 and 752 and bottom perpendicular elements 734, 744 and 754. In some embodiments, the first side bottom protrusion element 732 of the first side bottom extension 730 is installed underneath a first intermediate platform 702 of the base modular armored panel 700. In some embodiments, the first side bottom perpendicular element 734 resides in a space defined between a first remote perpendicular wall 703, a first elevated platform 704 and a first proximal perpendicular wall 705. In further embodiments, the first side bottom perpendicular element 734 is designed to be in close proximity to the first remote perpendicular wall 703. In such cases, at least one aperture 735 disposed on the first intermediate platform 702 is located above at least one aperture 736 disposed in the first side bottom protrusion element 732. Thus, enabling a ground connector to be inserted to and be accommodated in the at least one aperture 735, the at least one aperture 736 and the ground below the modular armor.

In some embodiments, a second side bottom protrusion element 742 of the second side bottom extension 740 is installed underneath a second intermediate platform 706 of the base modular armored panel 700. In some embodiments, a second side bottom perpendicular element 744 of the second side bottom extension 740 resides in a space defined by a second remote perpendicular wall 707, a second elevated platform 708 and a second proximal perpendicular wall 709. In further embodiments, the second side bottom perpendicular element 744 is designed to be in close proximity to the second remote perpendicular wall 707 of the base modular armored panel 700. In such cases, at least one aperture 745 disposed on the second intermediate platform 706 is located above at least one aperture 746 disposed on the second side bottom protrusion element 742. Thus, enabling a ground connector to be inserted to and accommodated in the at least one aperture 745, the at least one aperture 746 and the ground below the modular armor.

In some embodiments, the rear bottom perpendicular element 754 of the rear bottom protrusion element 750 is designed to be inserted into a first slit 710 located between the first elevated platform 704 and a first elevated extension 711. Additionally, the rear bottom perpendicular element 754 is further designed to be inserted into a second slit 712 located between the second elevated platform 708 and a second elevated extension 713. In some embodiments, the rear bottom perpendicular element 754 is designed to be in contact with the rear edge of the central platform 701 when the base modular armored panel 700 is installed thereon. In such cases, the first and second elevated extensions 711 and 713 are placed above a rear bottom protrusion element 752 of the rear bottom extensions 750. Thus, the rear modular armored panel is secured to the base modular armored panel 700. In some embodiments, the first side, second side and the rear bottom protrusion elements are located throughout their entire length on the same plane.

In some embodiments, all the apertures disposed in the base modular armored panel 700 and the bottom extensions 730, 740 and 750 have a similar diameter. In further embodiments, the diameter is designed to accommodate a ground connector such as anchor bolt. In other embodiments, the apertures located on the elevated platform may comprise a larger diameter to accommodate a larger ground connector.

Figure 8:
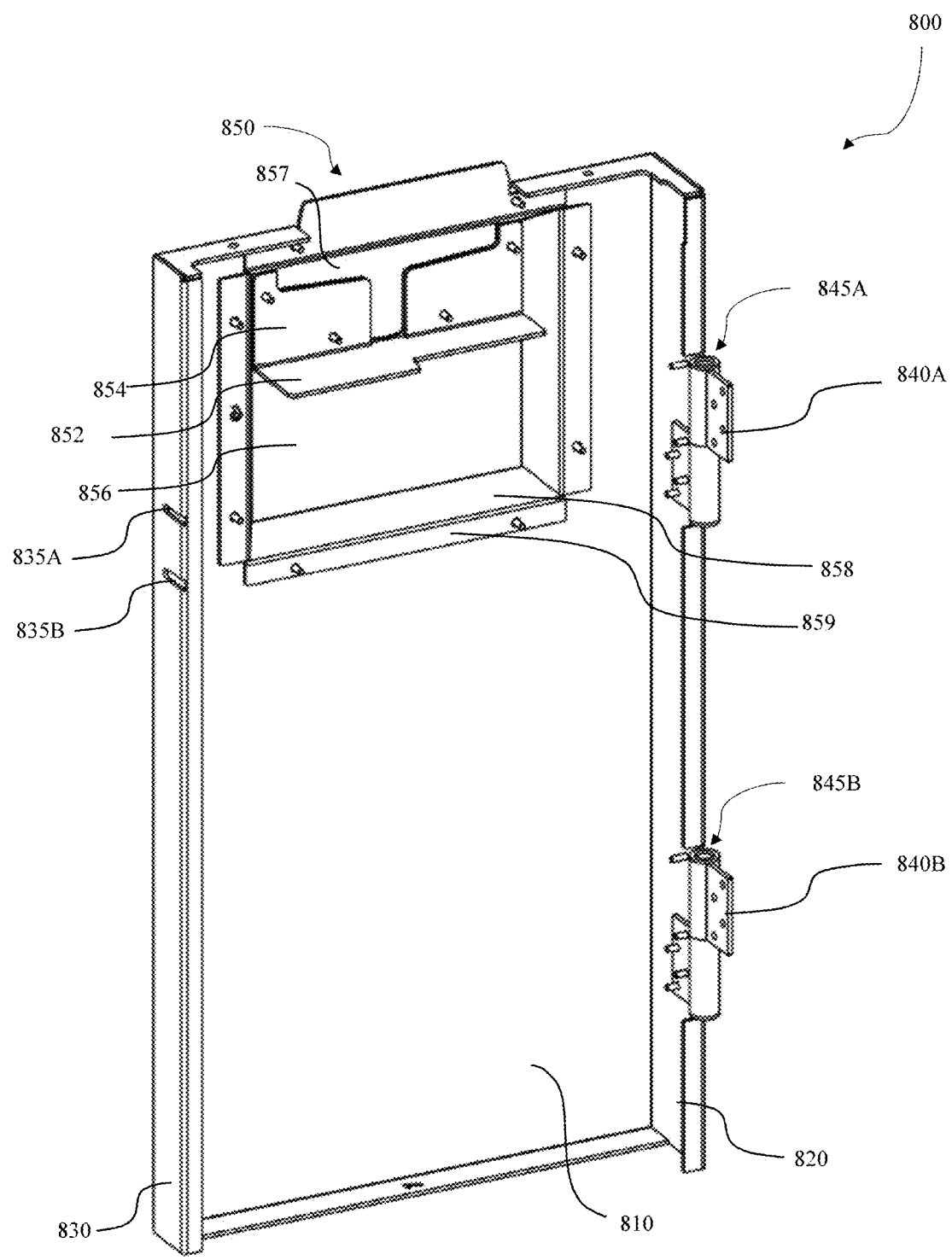
FIG. 8 discloses a front modular armored panel of the modular armor, according to exemplary embodiments of the subject matter; and, FIG. 9 discloses a method for assembling a modular armor, according to exemplary embodiments of the subject matter.

FIG. 8 discloses a front modular armored panel of the modular armor, according to exemplary embodiments of the subject matter. FIG. 8 shows a front modular armored panel 800 comprising a front inner surface 801 and a front outer surface 802. The front modular armored panel 800 is formed from a single plate of uniform thickness. The front modular armored panel 800 is configured to serve as an openable door to the modular armor. As such, the front modular armored panel 800 is configured to be connected to one of the side modular armored panels, and to be releasably secured to the other side modular armored panel.

The front modular armored panel 800 comprises a front central panel 810 comprising a first side front extension 820 and a second side front extension 830. The first side front extension 820 extends perpendicularly from a first lateral edge 811 and from the front inner surface 801 of the front modular armored panel 800. Additionally, the second side front extension 830 extends perpendicularly from a second lateral edge 812 and from the front inner surface 801 of the front modular armored panel 800. In some embodiments, the first and second side front extensions 820 and 830 may have the same length. In other embodiments, the length of one of the first and second side front extensions 820 and 830 may be larger than the other in order to allow the safe door of the ATM to be fully opened when the front modular armored panel 800 is opened. In some cases, the first side front extension 820 is larger than the second side front extension 830. In some embodiments, the first side front extension 820 may be rotatably connected to the first side modular armored panel by at least one hinge disposed in at least one recess in the first side front extension 820. The at least one hinge may be an upper hinge 840A and a lower hinge 840B disposed in an upper recess 845A and a lower recess 845B in the first side front extension 820.

In some embodiments, the second side front extension 830 may comprise at least one aperture disposed thereon. In further embodiments, the at least one aperture is a first aperture 835A and second apertures 835B, disposed vertically to each other. The first aperture 835A and second apertures 835B are designed to receive connectors therethrough for securing at least a portion of a locking element, which is configured to be secured to the second side front extension 830. In some embodiments, the locking element is further configured to be secured to the second side modular armored panel. In some embodiments, the locking element may be a hasp for a lock, for example, the hasp for the C-series of Mul-T-Lock Ltd. In such cases, half a hasp is disposed on the second side front extension 830 by connectors accommodated in the first and second apertures 835A and 835B, and half a hasp is disposed on the second side modular armored panel.

The front modular armored panel 800 comprises a cash interface reinforcing mechanism 850 situated in an aperture (not shown) disposed in the front central panel 810 of the front modular armored panel 800. In some embodiments, the cash interface reinforcing mechanism 850 is designed to allow a secured access to the cash exchange mechanism (not shown) of the ATM residing inside the modular armor. In some embodiments, the cash interface reinforcing mechanism 850 comprises a shelf 852, which separates the cash interface reinforcing mechanism 850 into a cash exchange portion 854 and an accommodation portion 856. The cash interface reinforcing mechanism 850 further defines a T shaped aperture 857, designed to enable users to pick up cash or other goods delivered by the ATM in the cash exchange portion 854. Additionally, the cash interface reinforcing mechanism 850 comprises an elevating wall 858, designed to elevate the cash interface reinforcing mechanism 850 from the front central panel 810. Additionally, the elevating wall 858 creates a volume which allows cash to be delivered and stacked horizontally and also serves to increase the distance between the cash exchange mechanism of the ATM and the users. The elevating wall 858 of the cash interface reinforcing mechanism 850 is perpendicularly bending at a distal portion 859 thereof, enabling the distal portion 859 to be attached by connectors to the front inner surface 801 of the front central panel 810.

In some embodiments, the front modular armored panel 800 may include additional apertures or recesses similar to the accommodation portion 856, for accommodating projections or other assemblies associated with the ATM residing inside the modular armor, as each model of an ATM be arranged slightly differently, resulting in a different front modular armored panel 800 with different dimensions, cutouts, and projections.

Figure 9:
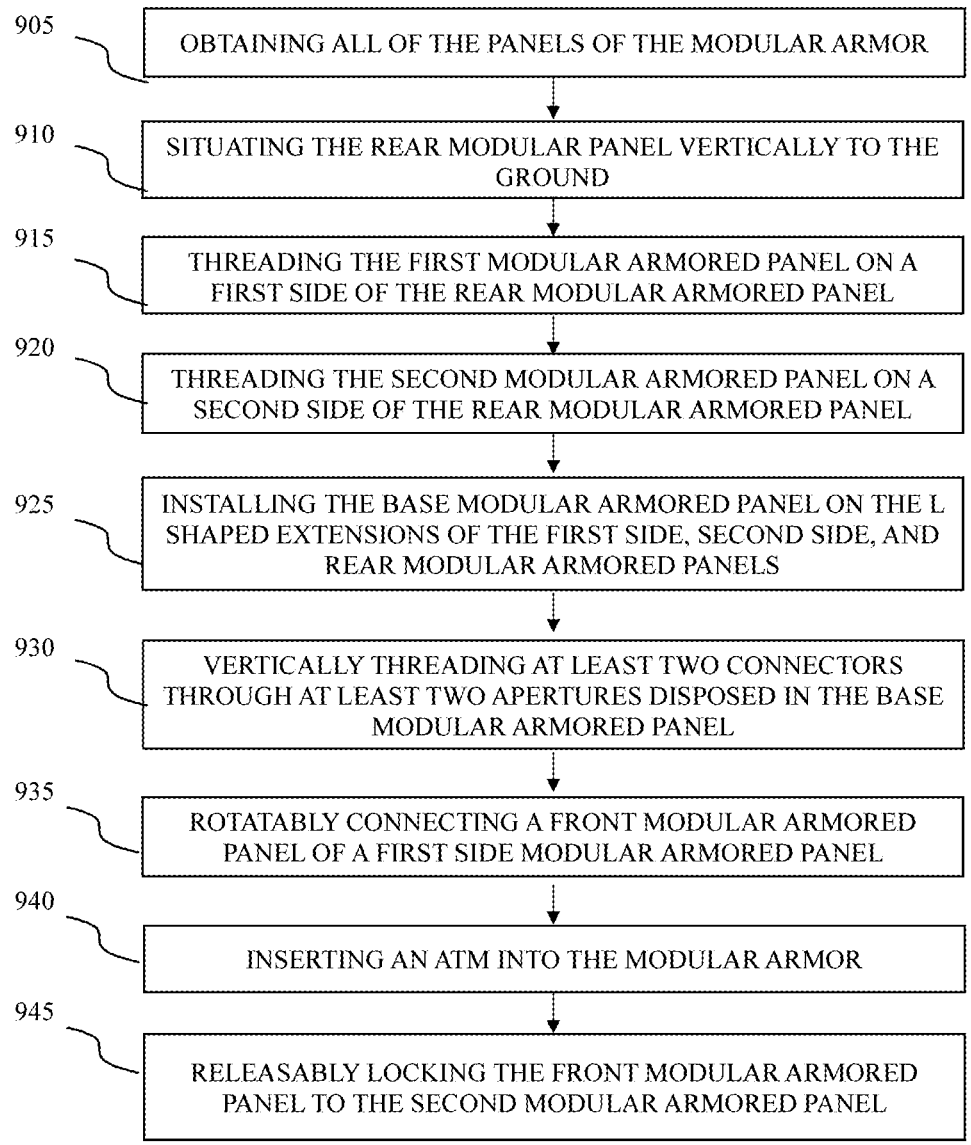

FIG. 9 discloses a method for assembling a modular armor, according to exemplary embodiments of the subject matter. In step 905, all the panels of the modular armor are obtained. In some embodiments, the panels include: a first side modular armored panel, a second side modular armored panel, a rear modular armored panel, a base modular armored panel and a front modular armored panel. In some cases, the person assembling the modular armor receives the panels stacked together one on top of the other, for example inside a box, which is easy and convenient to ship or transport. In step 910, the rear modular armored panel is situated vertically on the ground. In some cases, the ground may be a hardened layer (such as concrete), which enables a ground connector (such as anchor bolt) to be secured thereto. In further embodiments, the rear modular armored panel is placed with the outer surface thereof in close proximity to or in contact with a wall.

In step 915, the first side modular armored panel is threaded by the apertures on the rear extension thereof on the first side lateral connectors, located on a first lateral side of the rear modular armored panel. In some embodiments, the first side lateral connectors face downwards. In such cases, the threading is further defined as securing the vertical portion of the first side lateral connectors inside the apertures. For example, the rear modular armored panel is pushed downwards, thus secure the first side lateral connectors in the space between the perpendicular element and the inner surface of the rear modular armored panel and partly below the apertures.

In step 920, the second side modular armored panel is threaded by the apertures on the rear extension thereof on the second side lateral connectors, located on a second lateral side of the rear modular armored panel. In some embodiments, the second side lateral connectors face upwards. In such cases, the threading is further defined as securing the vertical portion of the first side lateral connectors inside the apertures. For example, after the apertures of the second side modular armored panel pass the vertical arm of the first side lateral connectors, the second side modular armored panel is pushed downwards, thus securing the second side lateral connectors in the space between the perpendicular element and the inner surface of the rear modular armored panel, and partly above the apertures.

In Step 925 the base modular armored panel is installed on the protrusion elements of the first side, the second side and the rear modular armored panels. The installation comprises placing the first intermediate platform of the base modular armored panel on the first side bottom protrusion element and inserting the first side bottom perpendicular element into the space beneath the first elevated portion of the base modular armored panel. The installation further comprising placing the second intermediate platform of the base modular armored panel on the second side bottom protrusion element and inserting the second side bottom perpendicular element into the space beneath the second elevated portion of the base modular armored panel. The installation also comprises placing the first and second slots of the base modular armored panel on the rear bottom perpendicular element, thus bringing the elevated extensions of the base modular armored panel above, and in parallel to the rear bottom protrusion element.

In step 930, at least two ground connectors are vertically threaded through at least two apertures in the base modular armored panel. In some cases, at least one ground connector is threaded through at least one aperture disposed on the first intermediate platform of the base modular armored panel, through at least one matching aperture disposed on the first side bottom protrusion element and into the ground. Additionally, at least one ground connector is threaded through at least one aperture disposed on the second intermediate platform of the base modular armored panel, through at least one matching aperture disposed on the second side bottom protrusion element and into the ground. Additional bolts may be threaded also through apertures located on the central platform of the base modular armored panel. In an optional embodiment, the modular armor is further secured by threading at least one ground connector through an aperture located in the rear modular armored panel and into a wall situated behind the rear modular armored panel.

In step 935, a front modular armored panel is connected to one of the side modular armored panels. In some embodiments, the front modular armored panel is connected to the first side modular armored panel via hinges. In step 940, an ATM is situated inside the modular armor. In some embodiments, the ATM may slide, backside first, on the smooth top of the elevated platforms of the base modular armored panel until the ATM is fully situated on the base modular armored panel. In step 945, the front modular armored panel is releasably secured to the second side modular armored panel by a locking element. In some cases, the locking element is situated on both the front modular armored panel and the second side modular armored panel.

While the disclosure has been described with reference to exemplary embodiments, it will be understood by those skilled in the art that various changes may be made, and equivalents may be substituted for elements thereof without departing from the scope of the invention. In addition, many modifications may be made to adapt a particular situation or material to the teachings without departing from the essential scope thereof. Therefore, it is intended that the disclosed subject matter not be limited to the particular embodiment disclosed as the best mode contemplated for carrying out this invention, but only by the claims that follow.

What is claimed is:

1. A modular armor, comprising:
   a rear modular armored panel comprising a first rear lateral edge, a second rear lateral edge and a rear bottom edge, wherein a plurality of lateral connectors are disposed on the first rear lateral edge and on the second rear lateral edge, the rear modular armored panel further comprises a rear bottom extension extending from said rear bottom edge;
   a first side modular armored panel comprising:
   (i) a first side rear extension extends from a first side rear edge of the first side modular armored panel, wherein the first side rear extension comprises a plurality of apertures designed to receive a plurality of lateral connectors disposed on the first rear lateral edge;
   (ii) a first side bottom extension extends from a first side bottom edge of the first side modular armored panel, wherein at least one aperture is designed to receive a ground connector disposed in the first side bottom extension;
   a second side modular armored panel comprises:
   (i) a second side rear extension extends from a second side rear edge of the second side modular armored panel, wherein the second side rear extension comprises a plurality of apertures designed to receive a plurality of lateral connectors disposed on the second rear lateral edge,
   (ii) a second side bottom extension extends from a second side bottom edge of the second side modular armored panel, wherein at least one aperture is designed to receive a ground connector disposed in the second side bottom extension;
   a base modular armored panel, comprising:
   (i) a first intermediate platform comprising a first intermediate proximal edge, wherein at least one aperture designed to receive a ground connector is disposed on said first intermediate platform, and wherein a first remote perpendicular wall extends vertically upwards from the first intermediate proximal edge,
   (ii) a first elevated platform comprising a first elevated remote edge and a first elevated proximal edge, wherein the first elevated platform is connected to said first remote perpendicular wall at the first elevated remote edge, and wherein a first proximal perpendicular wall extends vertically downward from the first intermediate proximal edge thereof,
   (iii) a central platform comprising a first central lateral edge and a second central lateral edge, wherein the central platform is connected to the first proximal perpendicular wall at the first central lateral edge thereof and wherein a second proximal perpendicular wall extends vertically upwards from the second central lateral edge thereof,
   (iv) a second elevated platform comprising a second elevated remote edge and a second elevated proximal edge, wherein the second elevated platform is connected to said second proximal perpendicular wall at the second elevated proximal edge thereof, and wherein the second remote perpendicular wall extends vertically downward from the second elevated remote edge thereof, and (v) a second intermediate platform comprising a second intermediate proximal edge, wherein at least one aperture designed to receive a ground connector is disposed on said second intermediate platform, and wherein the second intermediate platform is connected to said second remote perpendicular wall at the second intermediate proximal edge thereof;

a front modular armored panel comprising a first side front extension configured to be rotatably connected to the first side modular armored panel, and a second side front extension configured to be releasably secured to the second side modular armored by a locking element, wherein the modular armor comprises at least one ground connector designed to be threaded through the at least one aperture in the first intermediate platform, the at least one aperture in the bottom extension of the first side modular armored panel and into the ground, and at least one ground connector designed to be threaded through the second intermediate platform, the bottom extension of the second side modular armored panel and into the ground.

2. The modular armor of claim 1, wherein the bottom extensions of the first side, second side and rear modular armored panels are shaped in an L shape and comprises a bottom protrusion element and a bottom perpendicular element.

3. The modular armor of claim 2, wherein all the bottom protrusion elements of the bottom extensions are on the same plane, and wherein the plane is configured to be situated adjacent to the ground below the modular armor.

4. The modular armor of claim 1, wherein a first elevated extension is attached to the first elevated platform at a first elevated rear edge thereof, and a second elevated extension is attached to the second elevated platform at a second elevated rear edge thereof.

5. The modular armor of claim 4, wherein the first proximal and remote perpendicular walls and the second proximal and remote perpendicular walls extends throughout the entire length of the first and second elevated platforms and the first and second elevated extensions.

6. The modular armor of claim 5, wherein a first slot extends through the first proximal and remote perpendicular walls, and a second slot extends through the second proximal and remote perpendicular walls wherein the first and second slots are configured to receive therein at least a portion of the rear bottom extension.

7. The modular armor of claim 6, wherein the first slot may further extend through a portion of the first intermediate platform at a first intermediate proximal edge thereof, and the second slot may further extend through a portion of the second intermediate platform at a second intermediate proximal edge thereof.

8. The modular armor of claim 1, wherein said rear extensions of the first side and second side modular armored panel are shaped as an L shaped extension and comprising a rear protrusion element and a rear perpendicular element.

9. The modular armor of claim 8, wherein the plurality of apertures disposed on said first side and second side rear extensions are disposed on the rear perpendicular elements thereof.

10. The modular armor of claim 1, wherein the base modular armored panel further comprises at least one aperture disposed on the first and second elevated platforms; whereby the at least one aperture may enable a ground connector passing through a bottom portion a device residing inside the modular armor to pass through said base modular armored panel and into the ground.

11. The modular armor of claim 1, wherein the lateral connectors of the rear modular armored panel are L shaped.

12. The modular armor of claim 11, wherein the lateral connectors disposed on the rear first lateral edge are facing downwards, and the lateral connectors disposed on the rear second lateral edge are facing upwards.

13. The modular armor of claim 1, wherein the first and second proximal perpendicular walls comprises the same height and the first and second remote perpendicular walls comprises the same height, and wherein the first and second proximal perpendicular walls are higher than the first and second remote perpendicular walls.

14. The modular armor of claim 13, wherein the first and second intermediate platforms of the base modular armored panel are situated on a same plane which is parallel to and located adjacently above the central platform of the base modular armored panel and which is parallel to and located below the plane of the first and second elevated platforms.

15. The modular armor of claim 1, wherein the second side modular armored panel is longer than the first side modular armored panel.

16. The modular armor of claim 1, wherein the modular armor weighs 100 Kgs or less.

17. The modular armor of claim 16, wherein the modular armor weighs about 70 Kgs.

18. The modular armor of claim 1, wherein the locking element is a hasp, wherein a first half of the hasp is secured to said front second side extension of the front modular armored panel and the second half of the hasp is secured to the second side modular armored panel.

19. The modular armor of claim 1, wherein the first side, second side and rear modular armored panels are formed with the same thickness.

20. The modular armor of claim 1, wherein each of the modular armored panels of the modular armor is formed from a single sheet of metal.

* * * * *